# United States Patent

Nishida

(10) Patent No.: US 7,944,800 B2
(45) Date of Patent: May 17, 2011

(54) OPTICAL RECORDING HEAD, OPTICAL RECORDING HEAD MANUFACTURING METHOD AND RECORDING/REPRODUCING DEVICE

(75) Inventor: Naoki Nishida, Kusatsu (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 155 days.

(21) Appl. No.: 12/523,884

(22) PCT Filed: Jan. 10, 2008

(86) PCT No.: PCT/JP2008/050190
§ 371 (c)(1),
(2), (4) Date: Jul. 21, 2009

(87) PCT Pub. No.: WO2008/096566
PCT Pub. Date: Aug. 14, 2008

(65) Prior Publication Data
US 2010/0097918 A1   Apr. 22, 2010

(30) Foreign Application Priority Data
Feb. 9, 2007 (JP) ................................. 2007-030311

(51) Int. Cl.
*G11B 7/00* (2006.01)
(52) U.S. Cl. ..................... 369/112.27; 369/121
(58) Field of Classification Search ................ None
See application file for complete search history.

(56) References Cited

U.S. PATENT DOCUMENTS
2006/0221482 A1   10/2006   Matsumoto et al. ............ 360/59

FOREIGN PATENT DOCUMENTS

| JP | 2-166623 A | 6/1990 |
|---|---|---|
| JP | 2001-14745 A | 1/2001 |
| JP | 2003-6912 A | 1/2003 |
| JP | 2003-6913 A | 1/2003 |
| JP | 2005-108336 A | 4/2005 |
| JP | 2006-114102 A | 4/2006 |
| JP | 2006-294076 A | 10/2006 |
| JP | 2006-294917 A | 10/2006 |
| JP | 2007-4922 A | 1/2007 |
| WO | WO 2008/096566 A1 | 8/2008 |

*Primary Examiner* — Paul Huber
(74) *Attorney, Agent, or Firm* — Sidley Austin LLP

(57) ABSTRACT

Provided is a highly reliable optical recording head which has a small fluctuation of a quantity of light applied on a recording medium due to temperature. The optical recording head is provided with a light guide section for guiding light applied from a light source, a slider relatively moving to the recording medium, and a light transmitting section, which is arranged on the slider, transmits the light outputted from the light guide section and outputs the light toward the recording medium. The optical recording head is further provided with an adhesive layer, which is sandwiched between the light transmitting section and the light guide section and fixes the positions of the light transmitting section and the light guide section, and an elastic cohesive layer, which is sandwiched between the portions other than the light transmitting section of the slider and the light guide section.

10 Claims, 3 Drawing Sheets

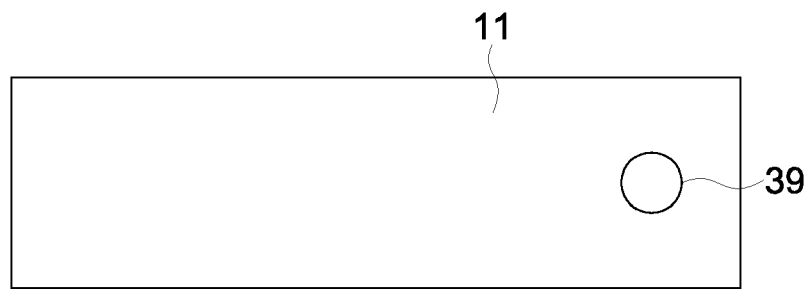
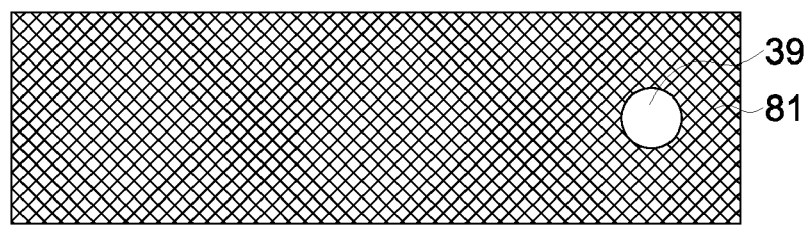
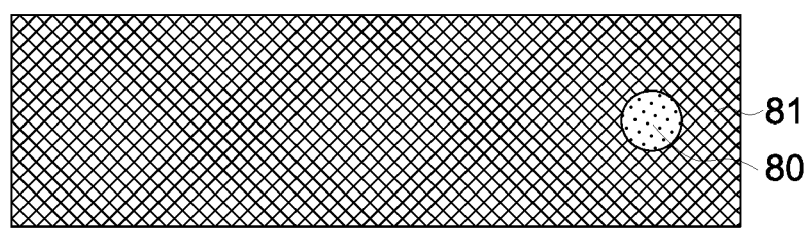
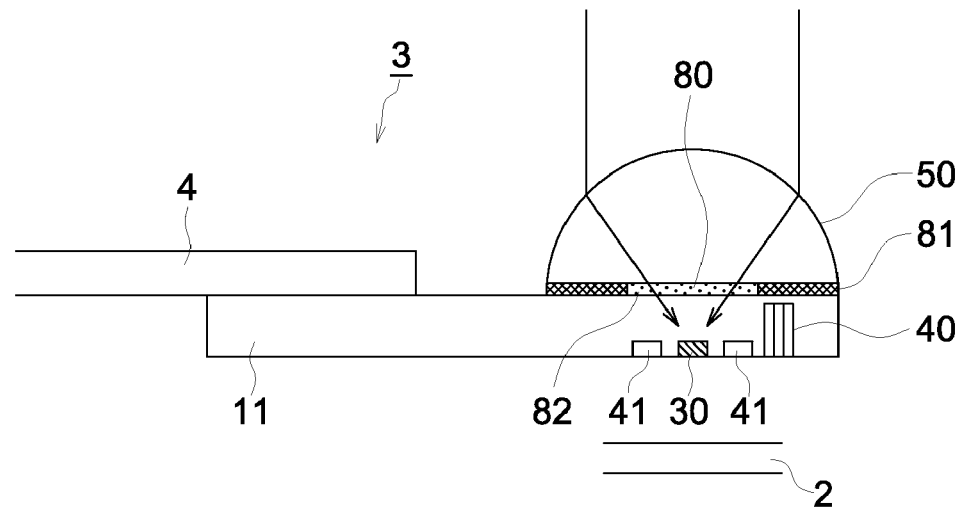

OPTICAL RECORDING HEAD, OPTICAL RECORDING HEAD MANUFACTURING METHOD AND RECORDING/REPRODUCING DEVICE

RELATED APPLICATIONS

This application is a U.S. National Phase Application under 35 USC 371 of International Application PCT/JP2008/050190 filed with Japanese Patent Office on Jan. 10, 2008.

FIELD OF THE INVENTION

The present invention relates to an optical recording head, an optical recording head manufacturing method and a recording/reproducing device.

BACKGROUND OF THE INVENTION

In a magnetic recording method, high recording density causes the magnetic bit to be seriously susceptible to ambient temperature and other factors. This requires use of a recording medium having a greater coercive force. However, use of such a recording medium, in turn, increases the magnetic field required recording. The upper limit of the magnetic field generated by the recording head depends on the saturation magnetic flux density. This value, however, has already come very close to the limit of the material, and a drastic increase cannot be expected. A solution to this problem is proposed in a technique where magnetic weakening is caused by local heating at the time of recording, and recording is performed when the coercive force is reduced, and heating is then suspended to cause natural cooling, thereby stabilizing the recorded magnetic bit. This technique is referred to as a heat-assisted magnetic recording system.

In the heat-assisted magnetic recording system, the recording medium is preferably heated instantaneously. Further, a heating device is not allowed to be in contact with a recording medium. Thus, it is a common practice to use absorption of light for heating. This method of using light for heating is referred to as an optically assisted magnetic recording method. The head that uses light to record on the recording medium is commonly called the optical recording head.

In order to levitate the optical recording head above the recording medium by force of air, the optical head has, on the surface opposed to the recording medium, a slider that generates a positive or negative pressure by the air flow caused by the rotation of the recording medium. Further, light is applied to the recording medium from a light transmitting section formed on the slider. This structure makes it necessary to lead light to a light transmitting section of the slider from a light source arranged inside a magnetic recording/reproducing device.

For example, disclosed is an optical recording head including a mirror substrate having a mirror surface on an inclined surface, a slider formed of transparent $SiO_2$, and an optical fiber, where light emitted from an optical fiber is reflected on the mirror surface, and is applied to the recording medium through the slider (Patent Document 1).

Another disclosed example is an optical recording head where an optical waveguide is used to lead light from the light source, and the light is applied to a minute opening of the slider through the reflection surface arranged on the optical waveguide (Patent Document 2).

Alternatively, a disclosed example is an optical recording head where an objective lens having an optical axis perpendicular to a recording medium is arranged on a slider, and light is condensed on the opening of the slider (Patent Document 3).

Patent Document 1: Japanese Unexamined Patent Application Publication No. 2003-6913
Patent Document 2: Japanese Unexamined Patent Application Publication No. 2003-6912
Patent Document 3: Japanese Unexamined Patent Application Publication No. 2001-14745

DISCLOSURE OF INVENTION

Problems To Be Solved By the Invention

The light guide section for leading light from a light source to a light transmitting section is generally fixed onto the slider by adhesion. However, the light guide section and slider are often formed of different materials. Thus, the difference in the coefficient of thermal expansion of the materials causes, depending on temperature, deviation of the position where light is projected. This will result in a reduction in the amount of light applied to a predetermined position of the recording medium. Further, particularly in the optically assisted magnetic recording head, there is a large increase in the temperature of the slider due to the generated heat, and this tends to raise the problem of creating cracks in the adhered portion.

The head disclosed in Patent Document 1 includes a mirror substrate made of silicon and a slider made of $SiO_2$. However, there is no reference to a method of bonding between the mirror substrate working as a light guide section and the slide, or problems due to temperatures.

Similarly, the head disclosed in Patent Document 2 includes an optical waveguide made of resin and a slider made of glass. However, there is no reference to a method of bonding between the optical waveguide working as a light guide section and the slider, or problems due to temperature.

Further, the head disclosed in Patent Document 3 includes an objective lens made of glass and a slider made of resin. However, there is no reference to a method of bonding between the objective lens working as a light guide section and the slider, or problems due to temperature.

In view of the prior art problems described above, it is an object of the present invention to provide a highly reliable optical recording head characterized by a reduced fluctuation, due to temperature, in the amount of light applied on the recording medium, an optical recording head manufacturing method, and a recording/reproducing device.

Means For Solving the Problems

1. An optical recording head, comprising:
a light guide section for guiding light emitted from a light source;
a slider adapted to move relatively to a recording medium;
a light transmitting section provided to the slider and adapted to allow emission light emitted from the light guide section to transmit therethrough and to exit toward the recording medium;
a light transmitting adhesive layer provided between the light transmitting section and the light guide section to fix a positional relationship between the light transmitting section and the light guide section; and
an elastic cohesive layer provided between the light guide section and a portion, of the slider, except the light transmitting section.

2. The optical recording head of item 1, wherein the light transmitting section is composed of a resin material.

3. The optical recording head of item 1 or 2, comprising:
a Plasmon probe provided on a light emitting surface of the light transmitting section.

4. The optical recording head of any one of items 1 through 3, wherein the slider is entirely composed of a light transmitting material.

5. A recording/reproducing device, comprising:
the optical recording head of any one of item 1 through 4.

6. A method for manufacturing an optical recording head having:
a light guide section for guiding light emitted from a light source;
a slider adapted to move relatively to a recording medium; and
a light transmitting section provided to the slider and adapted to allow emission light emitted from the light guide section to transmit therethrough and to exit toward the recording medium,
the method comprising the steps of:
forming an elastic cohesive layer on a portion of a surface of the slider, wherein the surface faces the light guide section, and the portion excludes the light transmitting section; and
forming an adhesive layer on a surface, of the light transmitting section, facing the light guide section; and
hardening the adhesive layer while placing the light guide section on the slider, after the steps of forming a cohesive layer and forming an adhesive layer.

7. The method for manufacturing an optical recording head of item 6, wherein in the step of forming a cohesive layer the elastic cohesive layer is formed on a whole of the surface of the slider, and then the cohesive layer on a portion on which the adhesive layer is to be formed is removed; and
in the step of forming an adhesive layer, the adhesive layer is formed on a portion from which the cohesive layer has been removed, after the cohesive layer is removed from the portion on which the adhesive layer is to be formed.

8. The method for manufacturing an optical recording head of item 6 or 7, wherein the adhesive layer is formed of a light curing resin.

9. The method for manufacturing an optical recording head of item 8, wherein the light curing resin is an ultraviolet curing resin.

10. The method for manufacturing an optical recording head of item 8 or 9, wherein light for curing the light curing resin is projected on the adhesive layer through the light guide section.

In the present invention, the light transmitting section of the slider is fixed to the light guide section with a light transmissive adhesive, the portion of the slider except the light transmitting section is bonded with an elastic cohesive layer. This arrangement reduces a fluctuation, due to temperature, in the amount of light applied to a recording medium, and eliminates the possibility of the bonded portion being separated by heat shock.

BRIEF DESCRIPTION OF THE DRAWINGS

FIGS. 3a, 3b, and 3c are plan views of the regions of the adhesive layer and cohesive layer formed on a slider in the first embodiment of the present invention;

FIG. 4 is a cross sectional view of the optical recording head in a second embodiment of the present invention.

DESCRIPTION OF REFERENCE NUMERALS

Figure 1:
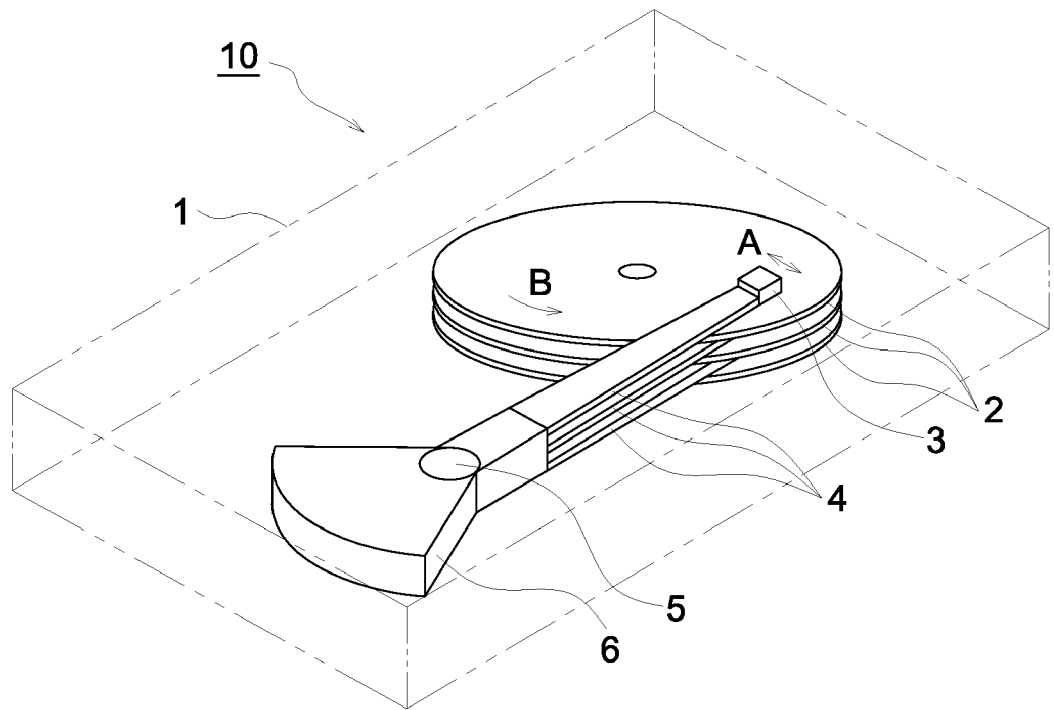
FIG. 1 is a perspective view of an example of the schematic configuration of an optically assisted magnetic recording/reproducing device.

1. Casing
2. Disk
3. Optical recording head
4. Suspension
10. Magnetic recording/reproducing device
11. Slider
13. Light guide section
14. Optical fiber
15. Sphere lens
16. Hemisphere lens
17. Reflection surface
30. Plasmon probe
39. Waveguide
40. Magnetic reproducing section
41. Magnetic recording section
50. SIL
80. Adhesive layer
81. Cohesive layer
82. Light transmitting section

BEST MODE FOR CARRYING OUT THE INVENTION

Referring to the drawings, the following describes a near field light generator (also called the plasmon probe) in the present invention, an optically assisted magnetic recording head and a magnetic recording/reproducing device equipped therewith. The same portions or equivalent portions in the embodiments will be assigned with the same reference numerals and will not be described to avoid duplication.

FIG. 1 is a schematic configuration diagram showing the hard disk as an example of the magnetic recording/reproducing device equipped with an optically assisted magnetic recording/reproducing device.

This magnetic recording/reproducing device 10 includes disks 2 for recording, a suspension 4 mounted rotatably in the direction of arrow A (tracking direction) using a spindle 5 as a fulcrum, and an actuator 6 for tracking mounted on the suspension 4, wherein these components are incorporated in a casing 1. This casing 1 also includes an optical recording head 3 mounted on the front end of the suspension 4, and a motor (not illustrated) for driving the disks 2 in the direction of arrow B. The optical recording head 3 is configured to make a relative movement while floating above the disk 2.

In this example, a plurality of disks 2 and optical recording heads 3 are stacked. For simplification, the following gives a detailed description of one particular head. Other heads have the same structure. The disk 2 is a recording medium of the present invention.

Figure 2:
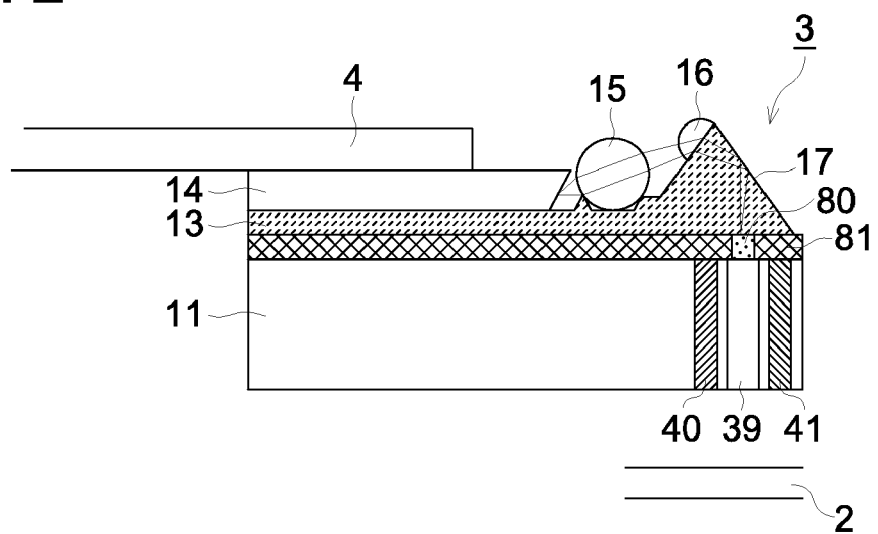
FIG. 2 is a cross sectional view of an optical recording head in a first embodiment of the present invention.

FIG. 2 is a cross sectional view of the optical recording head 3 in a first embodiment of the present invention.

The optical recording head 3 of the first embodiment includes a light guide section 13 on which a suspension 4, optical fiber 14, sphere lens 15 and hemisphere lens 16 are mounted, and a slider 11 which is equipped with a waveguide 39, magnetic recording section 41 and magnetic reproducing section 40.

On the light guide section 13, there are provided an optical fiber 14, a sphere lens 15, a hemisphere lens 16 and a suspension 4.

The light flux of near-infrared laser beam (having a wavelength of 1550 nm, 1310 nm, etc.) emitted from a light source (not illustrated) goes out from the optical fiber 14 in the upper-right direction, since the end face, of the optical fiber 14, on the light emitting side is obliquely cut. After that, the light enters the sphere lens 15. The sphere lens 15 is made of, for example, a glass ball (material: BK7) having a diameter of about 0.15 mm, and the light flux is roughly collimated by the sphere lens 15. Having passed through the sphere lens 15, the light flux enters the hemisphere lens 16. The hemisphere lens 16 is made of, for example, a hemisphere glass (material: BK7) having a diameter of about 0.09 mm, and is bonded to the light guide section 13.

The roughly collimated light flux emitting from the sphere lens 15 is condensed by the hemisphere lens 16 and is deflected by being reflected by a reflection surface 17 of the light guide section 13, the metallic material being deposited on the reflection surface 17. The light flux deflected on the reflection surface 17 passes through the adhesive layer 80, and is condensed onto the waveguide 39, having a diameter of about 10 μm, located immediately below, wherein silicon having a high refractive index is used as a medium. This completes coupling with the waveguide 39. In this case, the position at which the light is emitted to the waveguide 39 from the reflection surface 17 of the light guide section 13 must be positioned with an accuracy of about ±1 μm.

In the magnetic recording/reproducing device 10 equipped with the optical recording head 3, the light is applied to the disk 2 from the waveguide 39. This causes a temporary rise of temperature in the light-exposed portion on the disk 2, with the result that the coercive force of the disk 2 is reduced. Thus, the magnetic recording section 41 writes the magnetic information in the light-exposed portion where the coercive force of the disk 2 is reduced. Further, the magnetic information written on the disk 2 is read out with the magnetic reproducing section 40.

On the surface of the slider 11 opposed to the disk 2, there is provided a structure (air bearing surface structure, not illustrated) so as to levitate the slider 11 above the disk 2 by air flow the disk 2 rotates. Since negative or positive pressure caused by air flow is partially applied to the slider 11, the slider 11 is likely to warp. When the slider 11 warps, the direction of the light emitting from the waveguide 39 and the magnetic recording section 41 may be deviated from the recording track, with the result that recording operation may fail. To prevent this, it is preferred to use a ceramic material such as AlTiC or zirconia, which are rigid. This embodiment will be described, with reference to an example where AlTiC is used as a material for the slider 11. However, it should be noted that the present invention is not restricted to the use of AlTiC as a material for the slider 11. The present invention is also applicable to the cases where other materials are used.

In the meantime, while the light guide section 13 is generally made of silicon or glass, resin is now gathering attention as a material characterized by easy manufacturing process. This embodiment will be described with reference to an example where the resin such as PMMA is utilized as a material for the light guide section 13. However, it should be noted that this invention is not restricted to the use of resin as a material for the light guide section 13. The present invention is also applicable to the cases where other materials are used.

The waveguide 39 is a light transmitting section, and the light guide section 13 is the light guide section of the present invention.

As shown in FIG. 2, the waveguide 39 and light guide section 13 are bonded with the adhesive layer 80 sandwiched between the waveguide 39 and light guide section 13, and their positional relationship is fixed. The adhesive layer 80 is formed of the light transmissive adhesive, and therefore, permits light to pass therethrough.

The portion, of the slider 11, except the waveguide 39 and the light guide section 13 are bonded with the cohesive layer 81 sandwiched between the light guide section 13 and the portion, of the slider 11, except the waveguide 39.

Incidentally, AlTiC used as a material of the slider 11 has a linear expansion coefficient of about $8 \times 10^{-6}$/K. On the other hand, the resin used as a material of the light guide section 13 generally has a greater thermal expansion coefficient. PMMA, polycarbonate and polyolefin resin used for optical application will have a linear expansion coefficient of about $70 \times 10^{-6}$/K. When the materials having different thermal expansion coefficients are bonded with the adhesive, separation may be caused by repetitive heat cycles, and damage may occur in some cases.

The following describes the difference between the adhesive and cohesive. The adhesive is cured activate adhesive action, and the cohesive does not need to be cured. Thus, although there is a difference in the thermal expansion coefficient, the cohesive layer absorbs the difference when the elastic cohesive is used for bonding. Thus, separation or such damage will not occur easily. If attention is paid only to this point, it may be possible to use only the cohesive for bonding the slider 11 and light guide section 13.

However, in the case where the position of the light entering the waveguide 39 must be fixed with a high accuracy as in the present embodiment, thermal expansion will cause the deviation of the light position, with the result that the amount of light entering the waveguide 39 is reduced. Thus, the amount of light applied to the recording medium is also reduced.

In the present embodiment, the waveguide 39 in the slider 11 is bonded with the light guide section 13 with light transmissive adhesive, and the portion, of the slider 11, except the waveguide 39 is bonded with the elastic cohesive layer. This arrangement minimizes the fluctuation, due to temperature, in the amount of light applied on the disk 2 as a recording medium, and eliminates the possibility of the bonded portion being separated by a heat shock.

The above-mentioned advantage is conspicuous especially when the resin having a thermal expansion coefficient much different from that of the material used for the slider 11 is employed to form the light guide section 13.

As for other materials, the thermal expansion coefficient of zirconia to be used as the material for the slider 11 is about $10 \times 10^{-6}$/K, that of the silicon to be used as the material for the light guide section 13 is about $24 \times 10^{-6}$/K, and that of the glass (Pyrex glass in terms of registered trademark) is about $3 \times 10^{-6}$/K. As shown above, the difference is not as great as that between the resin material and ceramic material. However, the commonly employed material of the slider 11 and that of the light guide section 13 have different thermal expansion coefficients.

FIGS. 3a, 3b, and 3c are plan views of the regions of the adhesive layer 80 and cohesive layer 81 formed on the slider 11 in the first embodiment of the present invention.

The following Steps S1 through S3 will be described with reference to FIGS. 3, 3b, and 3c to show an example of the method of bonding the slider 11 and light guide section 13 of the present embodiment:

S1 . . . Cohesive layer forming step
S2 . . . Adhesive layer forming step
S3 . . . Bonding step FIG. 3a is a plan view showing the surface, of the slider 11, opposed to the light guide section 13 before forming the adhesive layer 80 or cohesive layer 81.

The following describes each of the steps:

S1: Forming the cohesive layer 81 on the portion of the surface, opposed to the light guide section 13, of the slider 11, except the waveguide 39.

Cohesive is coated on the slider 11, which is provided with the waveguide 39, for example, by using the gravure coater, micro-gravure coater, comma coater, bar coater, spray coater or ink jet method, whereby the cohesive layer 81 is formed. After that, laser processing or etching method is used to remove the cohesive from the portion where the adhesive layer 80 is to be formed. FIG. 3b shows the situation that the cohesive layer has been removed from the portion of the waveguide 39 where the adhesive layer 80 is to be formed in the subsequent step.

In an alternative method, cohesive can be coated using spray coater with the portion, to be provided with the adhesive layer 80, masked. Alternatively, the cohesive layer 81 can be formed using the ink jet method with a space left in the portion to be provided with the adhesive layer 80 ink jet method.

The examples of the cohesive include anaerobic cohesive made of urethane, epoxy, aquatic polymeric-isocyanate or acryl, and the anaerobic cohesive such as polyether methacrylate, ester methacrylate and oxidized polyether methacrylate. Further, a static eliminating agent or various types of fillers can be put into the cohesive using the conventionally known method.

S2: Forming an adhesive layer 80 on the waveguide 39 in the surface, of the slider 11, opposed to the light guide section 13.

As shown in FIG. 3c, the adhesive layer 80 is formed on the waveguide 39 of the slider 11, where the cohesive layer 81 was formed in Step S1, by applying adhesive thereto using the gravure coater, micro-gravure coater, comma coater, bar coater, spray coater or ink jet method. The adhesive layer 80 is formed of a light transmissive adhesive in such a way that the optical path of the light entering the waveguide 39 passes through the adhesive layer 80. The examples of light transmissive adhesive that can be used include acrylic UV curable resin and thermosetting resin.

S3: Curing the adhesive layer 80 while putting the slider 11 and the light guide section 13 in contact.

The slider 11 where the adhesive layer 80 and cohesive layer 81 were formed in Steps S1 and S2 is bonded to the light guide section 13, as shown in FIG. 2. To cause the adhesive layer 80 to be cured, light is applied to the adhesive layer 80, for example, from the optical fiber 14. Ultraviolet rays are applied, for example, when an acrylic UV curable resin is used as adhesive, and near-infrared rays are applied when a thermosetting resin is used.

The optical recording head 3 of the present invention can be manufactured according to the above-mentioned procedure. It should be noted that, in this embodiment, the cohesive layer and adhesive layer are formed in that order. However, the present invention is not restricted thereto. The adhesive layer and cohesive layer can be formed in this order by replacing the order of the Steps S1 and S2.

FIG. 4 is a cross sectional view of an optical recording head 3 in a second embodiment.

The optical recording head 3 of the second embodiment includes a slider 11 provided with a suspension 4, an SIL (Solid Immersion Lens) 50 and others.

In the optical recording head 3 of the second embodiment, the slider 11 is made, for example, of silicon, and a plasmon probe 30 is formed on the surface of the slider 11 opposed to the disk 2.

Near-infrared rays coming from a semiconductor laser (not illustrated) are condensed by the SIL 50 on the position close to the apex P (not illustrated) of the plasmon probe 30 formed on the slider 11, as indicated by the arrow mark of FIG. 4. The light transmitting section 82 refers to the portion of the slider 11 where the light flux condensed by the SIL 50 on the plasmon probe 30 passes through as indicated by the arrow mark of FIG. 4.

The present embodiment is described in cases where the slider 11 is integrally made of such material as silicon that transmits the light of a specific wavelength. The slider 11 can be made up of a substrate made of such opaque material as a ceramic, and a light transmitting section 82 made of light transmitting material.

The light transmitting section 82 refers to the light transmitting section of the present invention, and the SIL 50 is the light guide section of the present invention.

The light transmitting section 82 and SIL 50 are bonded with the adhesive layer 80 sandwiched between the light transmitting section 82 and SIL 50, and are fixedly positioned. The adhesive layer 80 is formed of the light transmissive adhesive, so that transmission of light is ensured.

When light has acted on the plasmon probe 30, plasmon resonance is excited and near field light is generated in the vicinity of the apex P. This permits recording or reproducing to be performed using the light of a very small spot size. To put it another way, a plasmon probe 30 is provided on the slider 11 to generate a near field light. This further reduces the size of the light spot condensed by the SIL 50. This provides an advantage in high-density recording.

In a magnetic recording/reproducing device 10 equipped with the optical recording head 3 based on the optically assisted technique, when a near field light is applied to the disk 2 from the plasmon probe 30, there is a temporary rise of temperature at the light-exposed portion of the disk 2, so that the coercive force of the disk 2 is reduced. Then magnetic information is written by the ring-shaped magnetic recording section 41 in the light-exposed portion, where the coercive force is reduced. Further, the magnetic information written into the disk 2 is read out by the magnetic reproducing section 40.

Similarly to the case of the first embodiment, fixing must be done with the SIL 50 positioned so as to accurately locate the position of the light applied to the plasmon probe 30.

The SIL 50 is made of silicon or glass. However, use of resin material is currently gathering attention because it is easy to process. When the SIL 50 is made of such material as PMMA, there will be a great difference between the material used and the slider 11 in the thermal expansion coefficient. As described with reference to the first embodiment, when materials of different thermal expansion coefficient are bonded with adhesive, separation may be caused by repetitive heat cycle, and damage may occur in some cases.

The present embodiment is described in a case where the SIL 50 is made of such resin material as PMMA. It should be noted that the application of the present invention is not restricted to the case of using the resin as a material for the SIL 50.

In the present embodiment, the light transmitting section 82 on the slider 11 is fixed to the SIL 50 with the light transmissive adhesive layer 80. Further, the portion, of the slider 11, except the light transmitting section 82 is bonded by the elastic cohesive layer 81. This arrangement minimizes the fluctuation, due to temperature, in the amount of the light applied to the disk 2, and eliminates the possibility of the bonded portion being separated by heat shock.

The above-mentioned advantage is conspicuous especially when the resin having a thermal expansion coefficient much different from that of the material used for the slider 11 is employed to form the SIL 50.

Figure 5A:
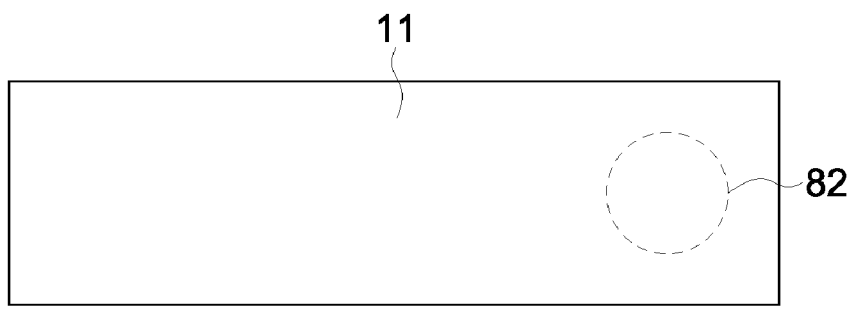
FIGS. 5a, 5b, and 5c are plan views showing the regions of the adhesive layer and cohesive layer formed on a slider in the second embodiment of the present invention.
Figure 5B:
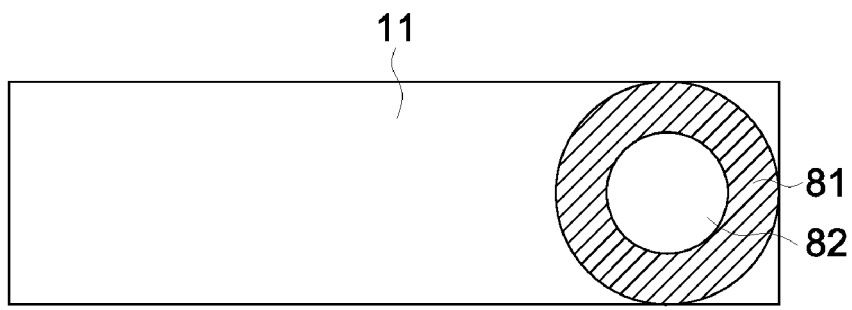
Figure 5C:
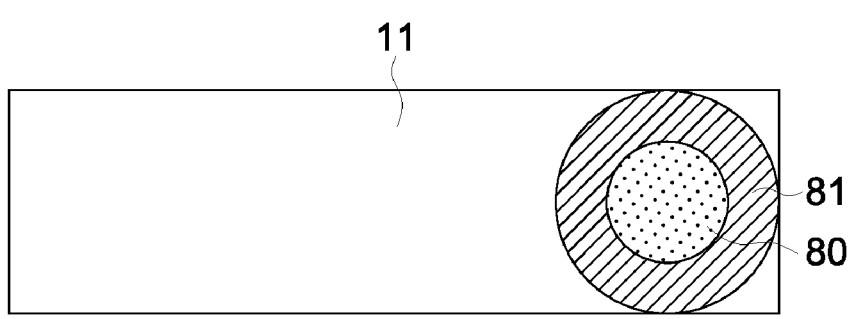

FIGS. 5*a*, 5*b*, and 5*c* are plan views representing the regions of the adhesive layer 80 and cohesive layer 81 formed on the slider 11 in the second embodiment.

Bonding between the slider 11 and the SIL 50 as a light guide section in the present embodiment is performed in the same procedure as that described with reference to the first embodiment. This will be described with reference to FIGS. 5*a*, 5*b*, and 5*c*. The same portions as those described with reference to the first embodiment will not be described to avoid duplication.

S1 . . . Cohesive layer forming step
S2 . . . Adhesive layer forming step
S3 . . . Bonding step FIG. 5*a* shows the slider 11 before forming the adhesive layer 80 or cohesive layer 81. It is a plan view representing the surface, of the slider 11, opposed to the SIL 50. The light transmitting section 82 is indicated by a dotted line.

The following describes each of the steps:

S1: Forming the cohesive layer 81 on the portion on the surface, of the slider 11, opposed to the SIL 50, except the light transmitting section 82.

Cohesive is coated on the slider 11, for example, by using the gravure coater, micro-gravure coater, comma coater, bar coater, spray coater or ink jet method, whereby the cohesive layer 81 is formed. After that, laser processing or etching method is used to remove the cohesive from the portion where the adhesive layer 80 is to be provided. FIG. 5*b* shows that the cohesive layer has been removed from the portion of the light transmitting section 82 where the adhesive layer 80 is to be provided in the subsequent step.

In an alternative method, cohesive can be coated using spray coater with the portion, to be provided with the adhesive layer 80, masked. Alternatively, the cohesive layer 81 can be formed using the ink jet method with a space left in the portion to be provided with the adhesive layer 80.

The same cohesive as that of the first embodiment can be used.

S2: Forming an adhesive layer 80 on the light transmitting section 82 on the surface of the slider 11 opposed to the SIL 50.

As shown in FIG. 5*c*, on the light transmitting section 82 of the slider 11 where the cohesive layer 81 was formed in Step S1, an adhesive layer 80 is formed by applying adhesive thereon using the gravure coater, micro-gravure coater, comma coater, bar coater, spray coater or ink jet method. The same adhesive as that of the first embodiment can be used.

S3: Curing the adhesive layer 80 while putting the slider 11 and the SIL 50 in contact.

The slider 11 wherein an adhesive layer 80 and cohesive layer 81 were formed in Steps S1 and S2 is bonded to the SIL 50, as shown in FIG. 4. To cause the adhesive layer 80 to be cured, light is applied to the adhesive layer 80 from the SIL 50. Ultraviolet rays are applied, for example, when an acrylic UV curable resin is used as adhesive, and near-infrared rays are applied when a thermosetting resin is used.

As described above, the light transmitting section 82 on the slider 11 is fixed to the SIL 50 with the light transmissive adhesive. Further, the portion, of the slider 11, except the light transmitting section 82 is bonded with the elastic cohesive layer. This arrangement minimizes the fluctuation, due to temperature, in the amount of light applied to the disk 2, and eliminates the possibility of the bonded portion being separated by heat shock.

In this Specification, description is made on the optical recording head 3 for conducting optically assisted magnetic recording, where this optical recording head 3 is provided with the magnetic recording section 41 and magnetic reproducing section 40, however the present invention is not restricted thereto and is applicable to any optical recording head that employs light for recording on a recording medium.

As described above, the present invention provides a highly reliable optical recording head characterized by a reduced fluctuation, due to temperature, in the amount of light applied to the recording medium, an optical recording head manufacturing method, and a recording/reproducing device.

The invention claimed is:

1. An optical recording head, comprising:
   a light guide section for guiding light emitted from a light source;
   a slider adapted to move relatively to a recording medium;
   a light transmitting section provided to the slider and adapted to allow emission light emitted from the light guide section to transmit therethrough and to exit toward the recording medium;
   a light transmitting adhesive layer provided between the light transmitting section and the light guide section to fix a positional relationship between the light transmitting section and the light guide section; and
   an elastic cohesive layer provided between the light guide section and a portion, of the slider, except the light transmitting section.

2. The optical recording head of claim 1, wherein the light transmitting section is composed of a resin material.

3. The optical recording head of claim 1, comprising:
   a Plasmon probe provided on a light emitting surface of the light transmitting section.

4. The optical recording head of claim 1, wherein the slider is entirely composed of a light transmitting material.

5. A recording/reproducing device, comprising:
   a recording medium; and
   an optical recording head adapted to record information on the recording medium, the optical recording head including:
     a light guide section for guiding light emitted from a light source;
     a slider adapted to move relatively to a recording medium;
     a light transmitting section provided to the slider and adapted to allow emission light emitted from the light guide section to transmit through the light transmitting section and to exit toward the recording medium;
     a light transmitting adhesive layer provided between the light transmitting section and the light guide section to fix a positional relationship between the light transmitting section and the light guide section; and
     an elastic cohesive layer provided between the light guide section and a portion, of the slider, except the light transmitting section.

6. A method for manufacturing an optical recording head having:
   a light guide section for guiding light emitted from a light source;
   a slider adapted to move relatively to a recording medium; and a light transmitting section provided to the slider and adapted to allow emission light emitted from the light guide section to transmit therethrough and to exit toward the recording medium, the method comprising the steps of:

forming an elastic cohesive layer on a portion of a surface of the slider, wherein the surface faces the light guide section, and the portion excludes the light transmitting section; and forming an adhesive layer on a surface, of the light transmitting section, facing the light guide section; and hardening the adhesive layer while placing the light guide section on the slider, after the steps of forming a cohesive layer and forming an adhesive layer.

7. The method for manufacturing an optical recording head of claim 6, wherein in the step of forming a cohesive layer the elastic cohesive layer is formed on a whole of the surface, of the slider, facing the light guide section, and then the cohesive layer on a portion on which the adhesive layer is to be formed is removed; and in the step of forming an adhesive layer, the adhesive layer is formed on a portion from which the cohesive layer was removed in the step of forming a cohesive layer.

8. The method for manufacturing an optical recording head of claim 6, wherein the adhesive layer is formed of a light curing resin.

9. The method for manufacturing an optical recording head of claim 8, wherein the light curing resin is an ultraviolet curing resin.

10. The method for manufacturing an optical recording head of claim 8, wherein light for curing the light curing resin is projected on the adhesive layer through the light guide section.

* * * * *